(12) United States Patent
Shoen

(10) Patent No.: US 8,230,960 B2
(45) Date of Patent: Jul. 31, 2012

(54) HOOD STRUCTURE OF WORK VEHICLE

(75) Inventor: Shigeo Shoen, Osaka (JP)

(73) Assignee: Kubota Corporation, Osaka (JP)

( * ) Notice: Subject to any disclaimer, the term of this patent is extended or adjusted under 35 U.S.C. 154(b) by 346 days.

(21) Appl. No.: 12/550,979

(22) Filed: Aug. 31, 2009

(65) Prior Publication Data

US 2010/0122863 A1    May 20, 2010

(30) Foreign Application Priority Data

Nov. 18, 2008  (JP) ................................ 2008-294456

(51) Int. Cl.
 *B62D 25/12* (2006.01)
(52) U.S. Cl. ................ 180/69.21; 180/69.2; 296/193.11
(58) Field of Classification Search ................. 180/69.2, 180/69.21; 296/193.11
See application file for complete search history.

(56) References Cited

U.S. PATENT DOCUMENTS

| | | | | |
|---|---|---|---|---|
| 4,382,482 A * | 5/1983 | Brandl et al. | ................. | 180/69.2 |
| 4,437,529 A * | 3/1984 | Fralish | ......................... | 180/69.2 |
| 5,465,803 A * | 11/1995 | Kircher et al. | ............. | 180/69.21 |
| 5,535,846 A * | 7/1996 | Kurtz et al. | ................. | 180/69.21 |
| 5,538,097 A * | 7/1996 | Stauffer et al. | ............. | 180/69.21 |
| 5,564,514 A * | 10/1996 | Knight | ........................ | 180/69.21 |
| 5,645,133 A * | 7/1997 | Thompson et al. | ........ | 180/69.21 |
| 5,738,179 A * | 4/1998 | Matsui | ........................ | 180/69.21 |
| 5,803,198 A * | 9/1998 | Baxter et al. | ............... | 180/69.21 |
| 6,003,204 A * | 12/1999 | Roach et al. | ..................... | 16/267 |
| 6,030,029 A * | 2/2000 | Tsuda et al. | ............. | 296/203.02 |
| 6,058,903 A * | 5/2000 | Downham | ................. | 123/198 E |
| 6,092,818 A * | 7/2000 | Shute | ......................... | 180/69.21 |
| 6,167,977 B1 * | 1/2001 | Adamson et al. | ............ | 180/69.2 |
| 6,834,735 B2 * | 12/2004 | Kim | ........................... | 180/69.21 |
| 6,942,056 B2 * | 9/2005 | Nadeau et al. | ................ | 180/274 |
| 7,191,860 B2 * | 3/2007 | Tucker et al. | .............. | 180/69.21 |
| 7,475,750 B2 * | 1/2009 | Tokuhara | ..................... | 180/69.2 |
| 7,540,345 B2 * | 6/2009 | Bigsby et al. | ............. | 180/69.21 |
| 7,558,658 B2 * | 7/2009 | Kuramoto et al. | .............. | 701/50 |
| 7,673,716 B2 * | 3/2010 | Moen et al. | ................... | 180/69.2 |
| 2003/0075371 A1 * | 4/2003 | Haun | ......................... | 180/69.21 |
| 2007/0169976 A1 * | 7/2007 | Bigsby et al. | ............. | 180/69.21 |
| 2007/0289790 A1 * | 12/2007 | Moen et al. | .................. | 180/69.2 |
| 2010/0122863 A1 * | 5/2010 | Shoen | ........................ | 180/69.21 |

FOREIGN PATENT DOCUMENTS

| | | |
|---|---|---|
| JP | 08048264 | 2/1996 |
| JP | 2002316669 | 10/2002 |
| JP | 2007055540 | 3/2007 |

\* cited by examiner

*Primary Examiner* — Jeffrey J Restifo
(74) *Attorney, Agent, or Firm* — The Webb Law Firm

(57) ABSTRACT

A hood structure of a work vehicle comprise, a hood supported to open and close relative to a vehicle body, the hood having a rear end portion bent toward an interior space of the hood to form a bent edge portion, an open-position retainer bracket attached to the rear end portion of the hood, and an open-position retainer member attached to the open-position retainer bracket to maintain the hood in an open position. The open-position retainer bracket extends cantileverwise forwardly of the hood from an attaching portion of the open-position retainer bracket that is attached to the rear end portion of the hood with a gap being defined between the open-position retainer bracket and a top surface of the hood. The open-position retainer member is attached to an extending end of the open-position retainer bracket.

4 Claims, 4 Drawing Sheets

HOOD STRUCTURE OF WORK VEHICLE

TECHNICAL FIELD

The present invention relates to a hood structure of a work vehicle comprising an open-position retainer member for maintaining an operable and closable hood in an open position.

BACKGROUND ART

The hood comprises right and left side hoods, a front hood, and an upper hood. The right and left hoods and the front hood are attached to a vehicle body. The upper hood is attached to the vehicle body to be pivotally open and close about a rear end pivotal axis.

A bracket is attached to a top surface of the upper hood. The open-position retainer member is pivotably attached to the bracket at a proximal end thereof. The open-position retainer member has a hook portion formed at a distal end thereof. The hook portion is engaged with the open-position retainer bracket extending from a bracket attached to an engine thereby maintaining the open position of the upper hood (see Japanese Unexamined Patent Application Publication No. 8-48264A, paragraph 0033; FIG. 3).

SUMMARY OF THE INVENTION

With the arrangement noted above, the bracket for attaching the open-position retainer member is attached to an inner side of the top surface of the upper hood. The bracket needs to be fixedly welded to the upper hood, which easily suffers from welding distortion in a portion of the upper hood where the bracket is attached. Thus, it is necessary to perform buffing or eliminate distortion after the welding is completed. This increases the number of work process while decreasing the operational efficiency.

The present invention provides a hood structure for a work vehicle capable of improving the operational efficiency.

A hood structure of a work vehicle in accordance with the present invention comprises:

a hood supported to open and close relative to a vehicle body, the hood having a rear end portion bent toward an interior space of the hood to form a bent edge portion;

an open-position retainer bracket attached to the rear end portion of the hood; and an open-position retainer member attached to the open-position retainer bracket to maintain the hood in an open position;

wherein the open-position retainer bracket extends cantileverwise forwardly of the hood from an attaching portion of the open-position retainer bracket that is attached to the rear end portion of the hood with a gap being defined between the open-position retainer bracket and a top surface of the hood, and wherein the open-position retainer member is attached to an extending end of the open-position retainer bracket.

The bent edge portion has a sufficient strength compared with the top surface of the hood by virtue of rib effects and work effects achieved by bending. As a result, the bent edge portion serves as a portion where the welding distortion hardly occurs. Thus, the open-position retainer bracket is attached to the portion forming the bent edge portion having the increased strength by fixing the open-position retainer bracket to the rear end of the hood, which dispenses with reinforcement of the hood.

As noted above, the present invention simplifies finishing operations including buffing and elimination of the distortion or the process of attaching the bracket, which improves the operational efficiency.

Further, if no gap is defined between the open-position retainer bracket and the top surface of the hood, the top surface of the hood receives force in a thrusting-up direction from the extending end of the open-position retainer bracket and the open-position retainer member when the hood in the open position is forced to be operated to the closed position. As a result, the portion of the top surface of the hood corresponding to the extending end of the open-position retainer bracket has a projecting shape.

On the other hand, if a gap is defined between the open-position retainer bracket and the top surface of the hood, it is prevented that the top surface of the hood contacts the extending end of the open-position retainer bracket when the hood is erroneously pushed down to switch to the closed position.

With the arrangement noted above, it is preferable that the hood structure further comprises an attaching stay fixed to an inner surface of the rear end of the hood; and a hood opening bracket for supporting the hood to open and close relative to a vehicle body;

wherein the hood opening bracket and the open-position retainer bracket are attached to the attaching stay.

Since the hood opening bracket and the open-position retainer bracket are attached to the attaching stay, the open-position retainer bracket is also attached to the hood just by fixedly attaching the attaching stay to the rear end of the hood. This simplifies the attaching process compared with the case where the hood opening bracket and the open-position retainer bracket are separately attached to the hood.

With the above-noted arrangement, it is also preferable that the attaching stay is fixed to the bent edge portion.

The attaching stay is fixed to the bent edge portion, which prevents the welding distortion from being exposed to the outside with the hood being closed. This reduces troublesome operations such as buffing or elimination of distortion relative to the bent edge portion.

DESCRIPTION OF THE PREFERRED EMBODIMENTS

Embodiments of the present invention will be described hereinafter in reference to the accompanying drawings.

Figure 1:
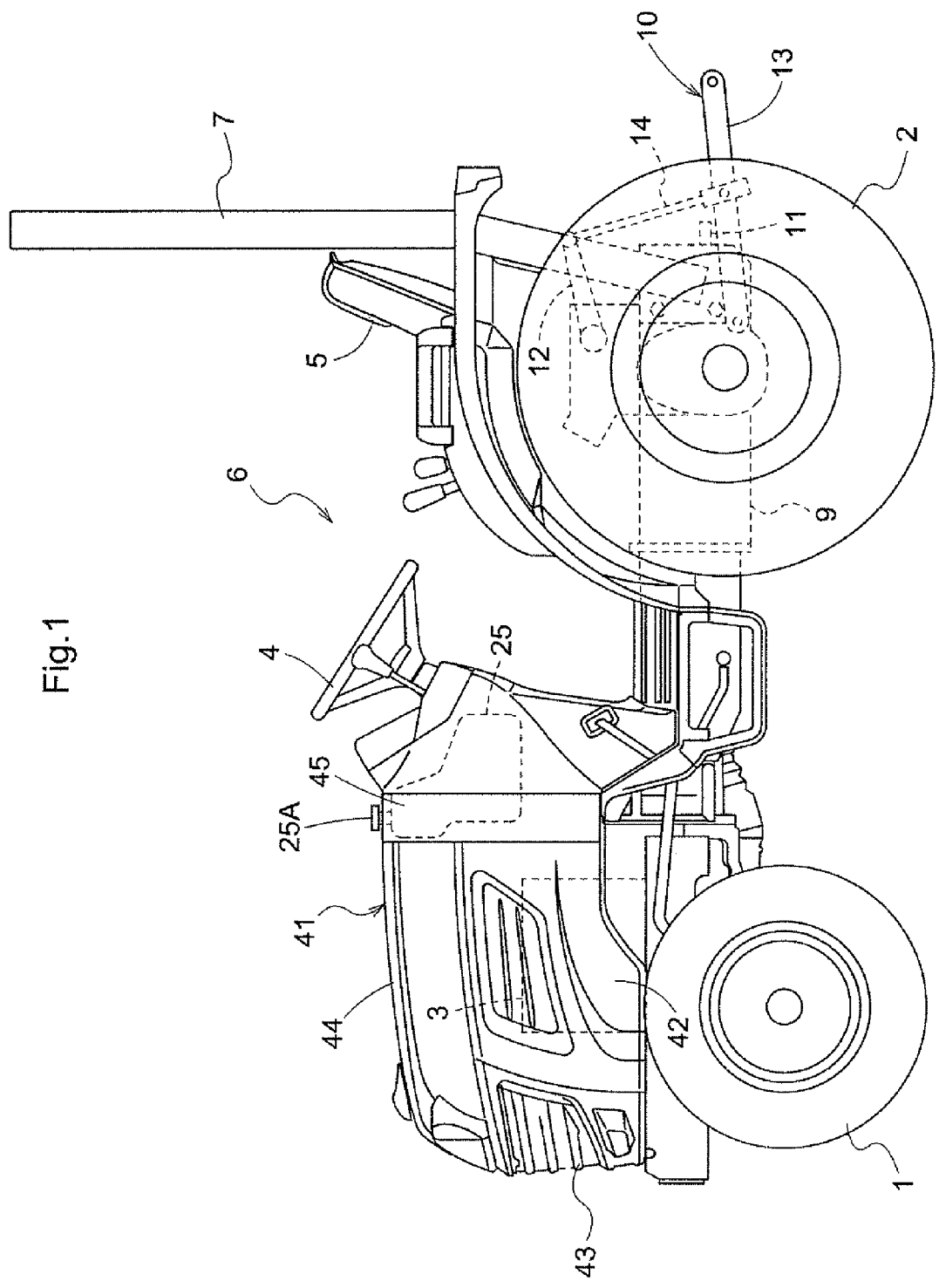
FIG. 1 is an elevation side view of a tractor.

FIG. 1 shows a tractor in accordance with the present invention comprising a self-propelling vehicle body. The self-propelling vehicle body includes a right and left steerable and driven front wheels 1, a right and left driven rear wheels 2, an engine 3 and a fuel tank 24 provided in a front part of the vehicle body, a driver's section 6 provided with a steering wheel 4 and a driver's seat 5, and a ROPS frame 7 provided in the vicinity of a rear part of the driver's seat 5. The tractor further comprises a link mechanism 10 supported by a transmission case 9, and a power take-off shaft 11 provided rearwardly of the transmission case 9. The transmission case 9 forms a rear part of a body frame of the self-propelling vehicle body. The link mechanism 10 includes a right and left pair of lift arms 12, a right and left pair of lower links 13, and a right and left pair of lift rods 14. The lift arms 12 are supported to lateral sides of an upper portion of the transmission case 9 to be vertically pivotable. The lower links 13 are supported to lateral sides of a lower portion of the transmission case 9 to be vertically pivotable. The right lift rod 14 is adapted to connect the right lift arm 12 to the right lower link 13 while the left lift rod 14 is adapted to connect the left lift arm 12 to the left lower link 13.

In this tractor, a rotary tiller (not shown) is connected to the rear part of the vehicle body through the link mechanism 10 to be vertically operable. A drive force is transmitted to the rotary tiller from the power take-off shaft 11. Various work implements other than the rotary tiller may also be used.

A hood 41 includes a right and left pair of side hoods 42, a front grille 43, and an upper hood 44. The front grille 43 is positioned forwardly of the side hoods 42. The upper hood 44 is positioned upwardly of the side hoods 42 and the front grille 43.

Figure 2:
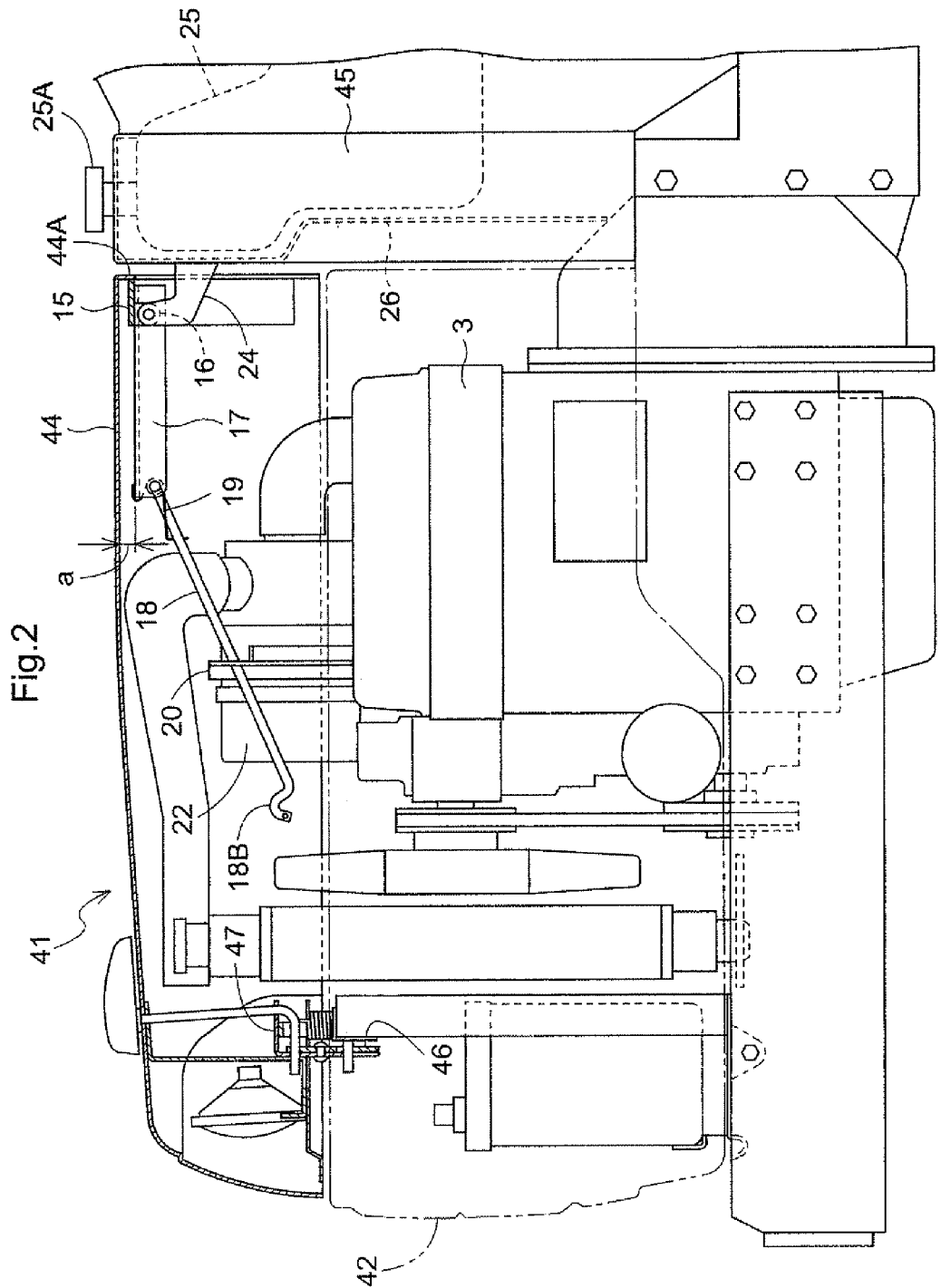
FIG. 2 is a side view of a hood in vertical section in a closed position.
Figure 3:
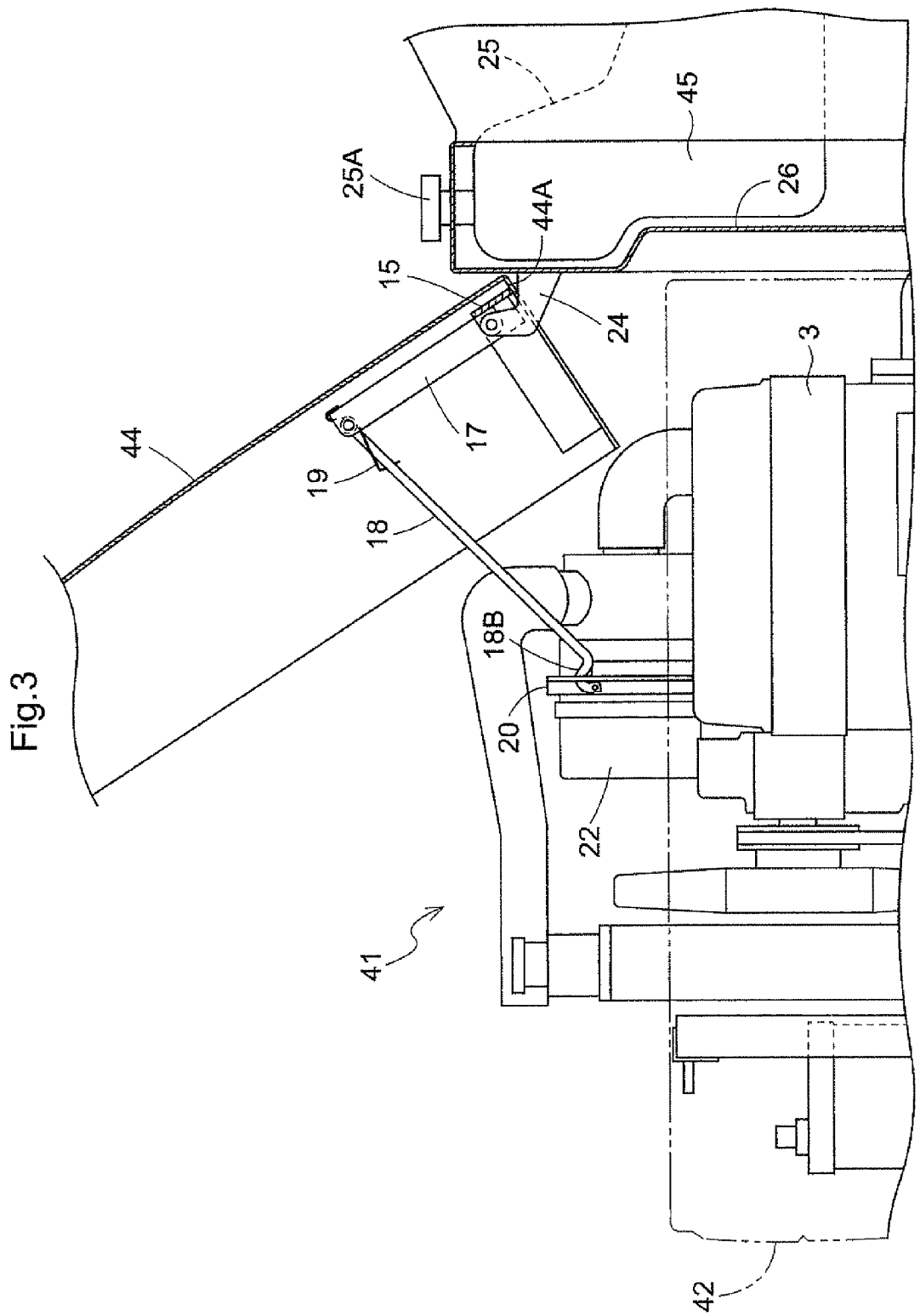
FIG. 3 is a side view of the hood in vertical section in an open position.

As shown in FIG. 3, the upper hood 44 is pivotally supported to receiving brackets 24 attached on a front surface of a heat-insulating plate 26. The upper hood 44 is moved upward away from the side hoods 42 and the front grille 43 to be in an open position to open upward. As shown in FIG. 2, the upper hood 44 is pivotally operated downward from the open position to be lowered adjacent to upper ends of the side hoods 42 and the front grille 43 to assume a closed position. The upper hood 44 covers above the engine 3 in the closed position.

As shown in FIGS. 1 to 3, a connecting frame 45 is mounted upright rearwardly of the hood 41. The connecting frame 45 is gate-shaped as viewed from a fore-and-aft direction of the vehicle body. The fuel tank 25 is mounted to extend from an interior space of the connecting frame 45 to a steering wheel post. The heat-insulating plate 26 is provided in a position between a front surface and an intermediate portion of the connecting frame 45 between the fuel tank 25 and the engine 3.

The connecting frame 45 has an opening formed therein. An oil-feeding port of the fuel tank 25 is provided in this opening. In this manner, the opening for the oil-feeding port is formed in the connecting frame 45 that has a greater strength than a top surface of the upper hood 44, which restrains decrease in the strength of the upper hood 44. Numeral 25A shown in FIGS. 2 and 3 denotes a fuel cap attached to the oil-feeding port of the fuel tank 25.

As seen from FIG. 2, the upper hood 44 is locked in the closed position when closed by a closing hook 46. The closing hook 46 is supported by a stay 47 extending between right and left side plate portions of the upper hood 44.

Figure 4:
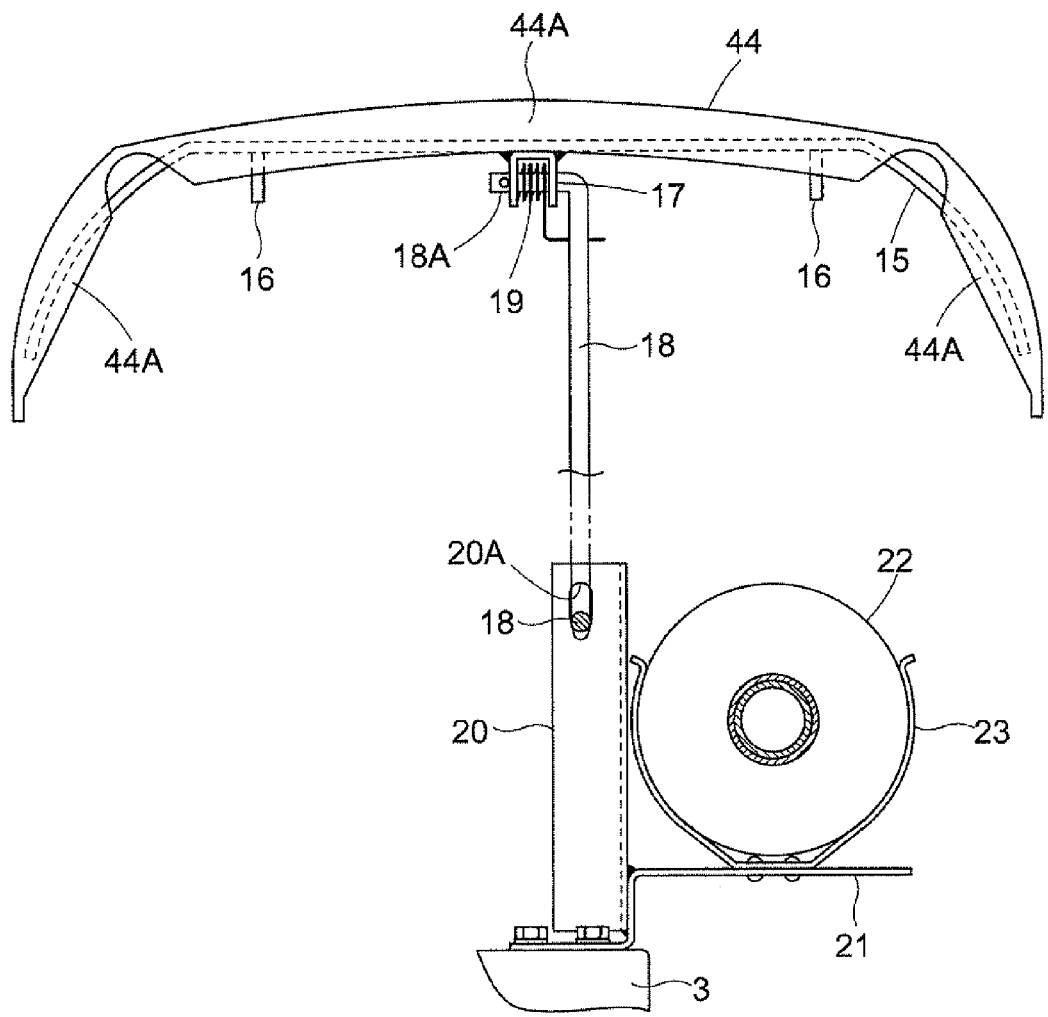
FIG. 4 is a rear view of the hood showing a connecting and supporting state of an open-position retainer member at an upper end and a lower end thereof.

An opening and closing supporting structure of the upper hood 44 will be described next. As shown in FIGS. 2 to 4, a bent edge portion 44A is formed in a rear end of the upper hood 44 to bend inward toward an interior space of the hood. More particularly, the rear end of the upper hood 44 has the downward bent edge portion 44A and the lateral bent edge portions 44A opposed to each other. The bent edge portion 44A reinforces the upper hood 44.

Figure 5:
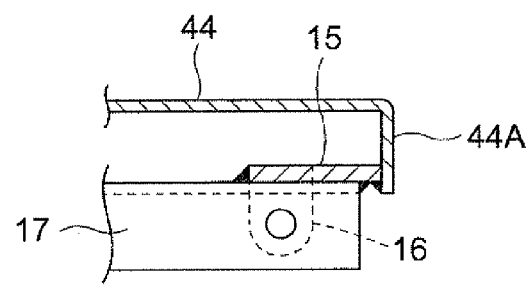
FIG. 5 is a side view of the hood in vertical section showing a state in which an attachment stay is fixedly welded to a bent edge portion formed in a rear end of the hood.

An attaching stay 15 is provided in an inner surface of the rear end of the upper hood 44. The attaching stay 15 is fixedly welded to the bent edge portion 44A at a rear end surface thereof. As shown in FIGS. 3 to 5, the attaching stay 15 includes a belt-like plate member that is bent to an arch shaped along the inner surface of the rear end of the upper hood 44. Fillet welding is applied to the belt-like plate member at plural positions in a longitudinal direction of the belt-like plate member with the rear end surface of the belt-like plate member being positioned sufficiently close to the inner side of the bent edge portion 44A.

The attaching stay 15 has a right and left pair of hood opening brackets 16 and an open-position retainer bracket 17 attached thereto. The right and left pair of hood opening brackets 16 allows the upper hood 44 to be supported by the connecting frame 45 acting as the vehicle body to open and close. An open-position retainer member 18 is attached to the open-position retainer bracket 17. The open-position retainer member 18 maintains the open position of the upper hood 44. The receiving brackets 24 are attached to the front surface of the heat-insulating plate 26. The receiving brackets 24 and the hood opening brackets 16 are relatively pivotably connected to each other whereby the upper hood 44 is attached to the vehicle body to be vertically pivotable about a horizontal axis.

As seen from FIGS. 2 to 4, the open-position retainer bracket 17 is fixedly mounted to the attaching stay 15 between the right hood opening bracket 16 and the left hood opening bracket 16. The open-position retainer bracket 17 includes a channel member. The channel member forming the open-position retainer bracket 17 is attached to the attaching stay 15 with its interior space being open downward. The open-position retainer bracket 17 has a rear end portion acting as an attaching portion that is attached to the attaching stay 15. The open-position retainer bracket 17 extends cantileverwise forwardly of the vehicle body.

A gap "a" is defined between the top surface of the upper hood 44 and the portion of the open-position retainer bracket 17 extending forward from the rear end portion attached to the attaching stay 15.

The open-position retainer member 18 is pivotably attached to an extending end portion of the open-position retainer bracket 17. The open-position retainer member 18 includes a single rod member. The open-position retainer member 18 has an upper end portion 18A that is bent transversely. The upper end portion 18A of the open-position retainer member 18 is transversely inserted into the open-position retainer bracket 17. The supporting member 18 is supported to be vertically pivotable about the horizontal axis of the upper end portion 18A.

The open-position retainer member 18 has a hook portion 18B formed in a distal end thereof. The hook portion 18B acts when the upper hood 44 maintains the open position. A coil spring 19 is provided in the upper end portion 18A to urge the open-position retainer member 18 upward.

As shown in FIGS. 2 to 4, a supporting bracket 20 is mounted upright on an upper end of the engine 3. More particularly, the supporting bracket 20 is fixedly attached to an air cleaner bracket 21 attached to the upper end of the engine 3 to extend upright along an air cleaner 22. The air cleaner 22 is supportingly attached to a plate spring supporting member 23 fixed to the air cleaner bracket 21. The supporting bracket 20 receives the hook portion 18B provided in the distal end of the open-position retainer member 18. More particularly, a through bore 20A is formed in an upper end portion of the supporting bracket 20. The through bore 20A is shaped as a slot elongated vertically. The hook portion 18B of the open-position retainer member 18 is engaged with the through bore 20A. When the engaged condition of the hook portion 18B is released, the hook portion 18B projects forward extending through the through bore 20A.

More particularly, as shown in FIG. 3, the hook portion 18B has a size to allow it to extend through the through bore 20A. The hook portion 18B is engaged with an edge portion of the through bore 20A, whereby the upper hood 44 is supported in the open position by the open-position retainer member 18.

When the upper hood 44 is switched to the closed position, as shown in FIG. 2, the hook portion 18B is removed from the edge portion to project downward of the through bore 20A to allow the rod portion to be slidably supported by the through bore 20A, thereby switching the upper hood 44 to the closed position.

ALTERNATIVE EMBODIMENTS (1) The rod member having shaped opposite ends is used as the open-position retainer member 18. A plate member, for example, may be used instead of the rod member.

(2) The open-position retainer member 18 has the hook portion 18B formed at the distal end thereof. The hook portion 18B is engaged with the supporting bracket 20 to maintain the upper hood 44 in the open position by the open-position retainer member 18 while removed from the supporting bracket 20 to extend through the rod portion thereby switching the upper hood 44 to the closed position. Instead, the open-position retainer member 18 may be formed as a bent link having a bent portion formed in an intermediate portion thereof that is connected to the open-position retainer bracket 17 at an upper end thereof and to the supporting bracket 20 at a distal end thereof.

(3) The open-position retainer bracket 17 is attached to the upper hood 44 through the attaching stay 15. Instead, the open-position retainer bracket 17 may be directly fixed to the bent edge portion of the upper hood 44.

(4) As the structure of the hood 41, only the upper hood 44 is pivotally opened. Instead, the entire hood 41 may be pivotally opened.

(5) In the above-noted embodiment, the attaching stay 15 is attached to the bent edge portion 44A, which is not restrictive. For example, the attaching stay 15 may be attached to a top inner surface of the upper hood 44 adjacent to the bent edge portion 44A. It is also possible that the attaching stay 15 is attached to both the bent edge portion 44A and the top surface of the upper hood.

(6) The open-position retainer bracket 17 may be directly fixed to the rear end of the upper hood 44 dispensing with the attaching stay 15. In this case, the open-position retainer bracket 17 may also be fixed to the bent edge portion 44A or fixed to the top inner surface of the upper hood adjacent to the bent edge portion 44A. Further, it is possible that the open-position retainer bracket 17 is attached to both the bent edge portion 44A and the top surface of the upper hood.

What is claimed is:

1. A hood structure of a work vehicle, comprising:
   a hood supported to open and close relative to a vehicle body, the hood having a rear end portion bent toward an interior space of the hood to form a bent edge portion;
   an open-position retainer bracket attached to the rear end portion of the hood; and
   an open-position retainer member attached to the open-position retainer bracket to maintain the hood in an open position;
   wherein the open-position retainer bracket is attached directly or indirectly to the bent edge portion and extends cantileverwise forwardly of the hood from an attaching portion of the open-position retainer bracket adjacent to the bent edge portion with a gap being defined between the open-position retainer bracket and a top surface of the hood, and wherein the open-position retainer member is attached to an extending end of the open-position retainer bracket.

2. The hood structure as defined in claim 1, further comprising:
   an attaching stay fixed to an inner surface of the rear end of the hood; and
   a hood opening bracket for supporting the hood to open and close relative to a vehicle body;
   wherein the hood opening bracket and the open-position retainer bracket are attached to the attaching stay.

3. The hood structure as defined in claim 2, wherein the attaching stay is fixed to the bent edge portion.

4. A hood structure of a work vehicle, comprising:
   a hood supported to open and close relative to a vehicle body, the hood having a rear end portion bent toward an interior space of the hood to form a bent edge portion;
   an open-position retainer bracket attached to the rear end portion of the hood; and
   an open-position retainer member attached to the open-position retainer bracket to maintain the hood in an open position;
   an attaching stay fixed to the bent edge portion on an inner surface of the rear end of the hood; and
   a hood opening bracket for supporting the hood to open and close relative to a vehicle body;
   wherein the hood opening bracket and the open-position retainer bracket are attached to the attaching stay;
   wherein the open-position retainer bracket extends cantileverwise forwardly of the hood from an attaching portion of the open-position retainer bracket that is attached to the rear end portion of the hood with a gap being defined between the open-position retainer bracket and a top surface of the hood, and wherein the open-position retainer member is attached to an extending end of the open-position retainer bracket.

* * * * *